Dec. 18, 1956     C. T. HULTIN     2,774,448
INERTIA RESPONSIVE SHOCK ABSORBER
Filed April 28, 1953

Inventor
Clifford T. Hultin

Dec. 18, 1956 C. T. HULTIN 2,774,448
INERTIA RESPONSIVE SHOCK ABSORBER
Filed April 28, 1953 2 Sheets-Sheet 2
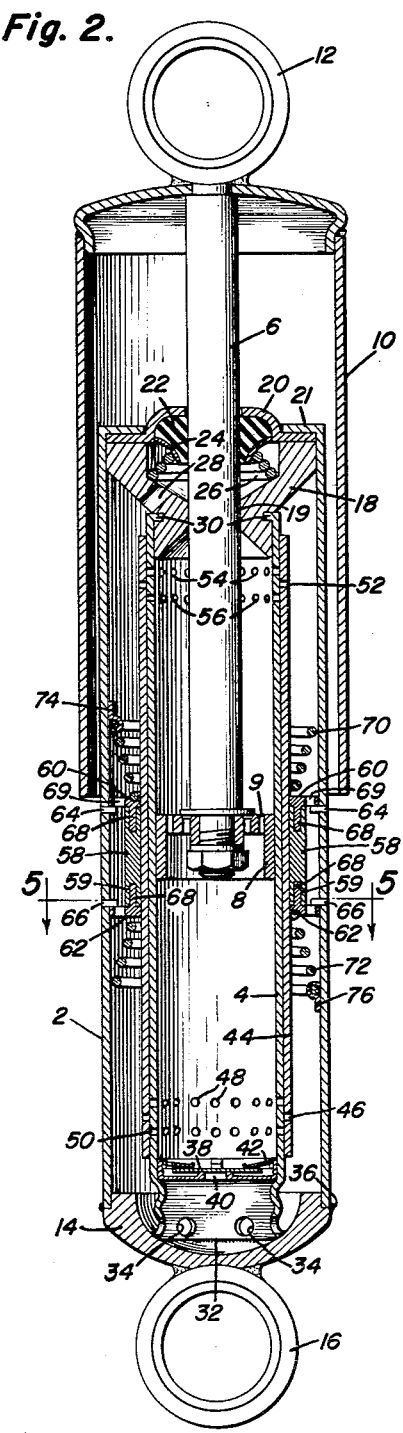
Fig. 2.
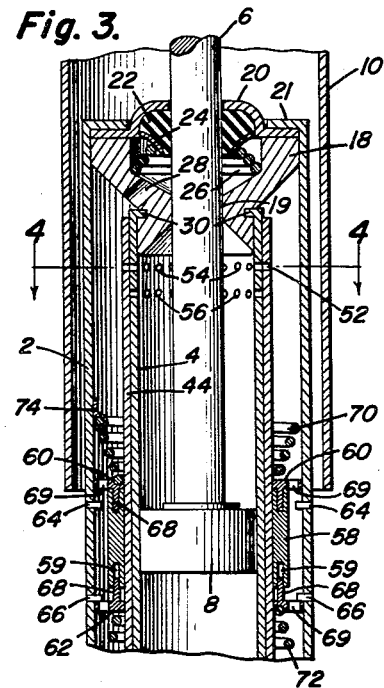
Fig. 3.
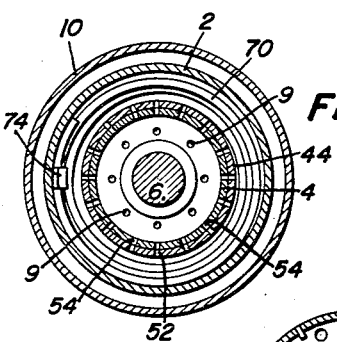
Fig. 4.
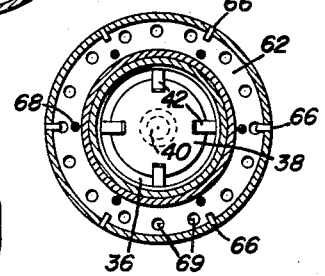
Fig. 5.
Fig. 9.
Inventor
Clifford T. Hultin

United States Patent Office 2,774,448
Patented Dec. 18, 1956

2,774,448
INERTIA RESPONSIVE SHOCK ABSORBER

Clifford T. Hultin, Arlington, Va.

Application April 28, 1953, Serial No. 351,762

7 Claims. (Cl. 188—88)

(Granted under Title 35, U. S. Code (1952), sec. 266)

The invention described herein may be manufactured and used by or for the Government for governmental purposes, without the payment to me of any royalty thereon.

This invention relates to a direct action shock absorber. More particularly, it relates to a shock absorber comprising a hydraulic piston and cylinder. The invention further relates to a direct action hydraulic shock absorber wherein sudden and violent motions are not snubbed or resisted but where the rebound movement is resisted following the initial motion.

Direct action shock absorbers are well known in the art and are normally used in a vertical or near vertical position between the frame and running gear of motor vehicles and the like. Such shock absorbers normally resist or snub in both directions and are, accordingly, called double acting. This type of shock absorber is very satisfactory for smoothing out the vehicle body movements due to small irregularities in the road surface. For the larger bumps and depressions, however, it is not wholly satisfactory since it does not prevent initial large body movements relative to the running gear, which movements are produced by spring action and have to be subsequently damped out.

The reason for this phenomenon becomes clearer upon an analysis of the events taking place when a sharp elevation or bump in the road surface is passed over. As the wheel begins to mount the bump, the spring absorbs the deflection since the vehicle body remains essentially stationary due to its relatively large inertia. The potential energy stored in the spring immediately begins to exert pressure on the body, however, and although the action is delayed, it will eventually throw the body upward. Depending on the speed of the vehicle and the period of the spring and body, this upward movement of the body usually takes place after the wheels have passed over the bump and are again regaining level ground. The result is a large deflection of the body upward which, on the rebound, usually bottoms or crashes on the rubber bumpers. This represents an extreme example of the violent spring action which takes place when passing a large bump in the absence of any shock absorber.

When a double acting shock absorber is mounted between the axle and the vehicle body, the spring action is very much dampened but a fairly large body deflection is still possible. The reason for this also becomes clear when the sequence of events is considered. When the wheel first mounts the bump the spring is deflected as before and an upward force is exerted on the vehicle body by the spring. This force is simultaneously augmented by the resistance of the shock absorber, with the result that the body tends to be thrown upward more quickly than was the case with spring action alone. Thus, the body will move upward somewhat earlier, but the moment the wheel reaches its highest point of travel and starts downward, the shock absorber will begin to exert a force the other way with the result that the amount of deflection of the vehicle body is minimized. As the wheel falls down to the level road surface after passing the bump, the shock absorber exerts a downward force against the force of the spring and also against the now upward inertia of the vehicle body. When the wheel reaches the level road surface, reverse action again occurs and the shock absorber then begins to exert an upward force against the descending vehicle body, thereby preventing the bottoming tendency before mentioned. Thus we see that a double acting shock absorber will have a tendency to produce body deflections earlier, to minimize the total deflection and to dampen them out quickly. It is significant, that for damping deflections of the vehicle body produced by the wheels passing over large bumps, a single acting shock absorber is often basically superior to the double acting variety. This will again be evident if we study the sequence of the relative movements taking place between the axle and vehicle body when equipped with such a shock absorber.

In this situation, the first events will be akin to those first described when no shock absorber was present. This is so because the usual type of single acting shock absorber is constructed so as to exert no force when the axle rises toward the vehicle body but to snub the reverse motion. Thus, only the spring is deflected and the shock absorber does not exert a force upward in collaboration with the spring as was the case with the double acting variety. By the time the inertia of the body has been overcome and the body begins to move upward, the wheel will have passed over the maximum elevation of the bump and will be moving downward. The shock absorber, accordingly, begins to exert a force downward substantially before the body has a chance to move upward. The result is that the force of the shock absorber acting downward will have a tendency to dissipate a large part of the potential energy stored in the spring before it has a chance to substantially affect the movement of the vehicle body. It should be noted, however, that the single acting shock absorber will aggravate the situation where the wheel falls into a depression. In that case, it will tend to pull the body down toward the axle as the wheel falls into the depression and will not serve to snub this downward action of the vehicle body when the wheel again rises from the depression. The result is that a single acting shock absorber is liable to produce a bottoming of the body on the bumpers when the wheels fall into such a depression.

In other words, a single acting shock absorber is inferior to a double acting shock absorber in this instance; whereas it will be superior to a double acting shock absorber when passing over a bump. A study of the events will show immediately that to effect a situation where the wheel passes a depression would require a single acting shock absorber with reverse characteristics from those described before. In other words, the shock absorber should snub the movement of the axle and vehicle body coming together and should permit the axle and vehicle body to move apart without resistance. What is needed to smoothen vehicle body action when passing large bumps and depressions in the road surface, is a single acting shock absorber which will snub in reverse directions depending upon whether the initial violent movement of the axle is up or down.

The present invention is designed to accomplish this result and to give normal double acting shock absorber action on moderate road surfaces.

In the drawings, Fig. 1 shows a direct acting shock absorber wherein the outside cylinders are in section.

Fig. 2 shows the same shock absorber wherein the inside and outside cylinders are in section.

Fig. 3 shows an upper portion of the shock absorber of Fig. 2, wherein a sliding sleeve valve is in an extreme end position.

Figure 1:
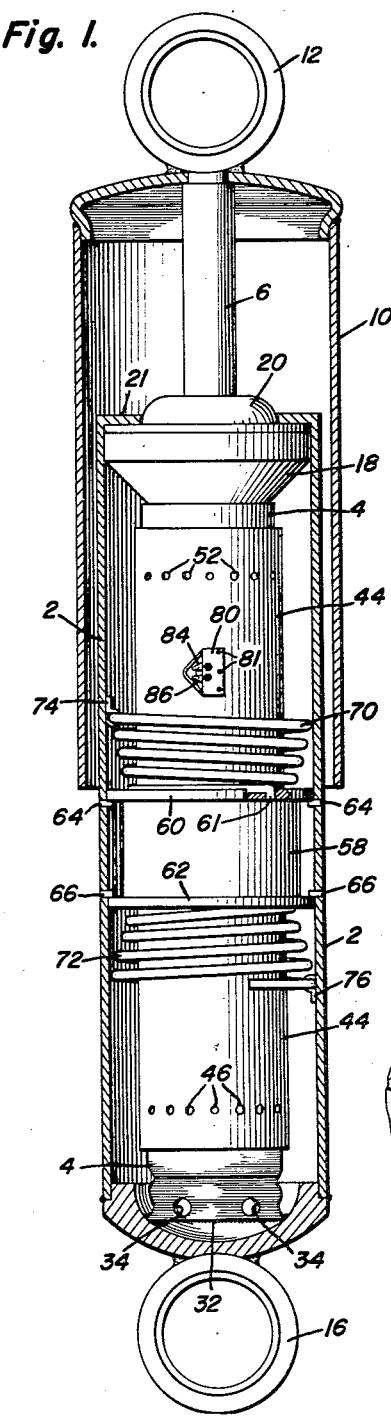
Figure 6:
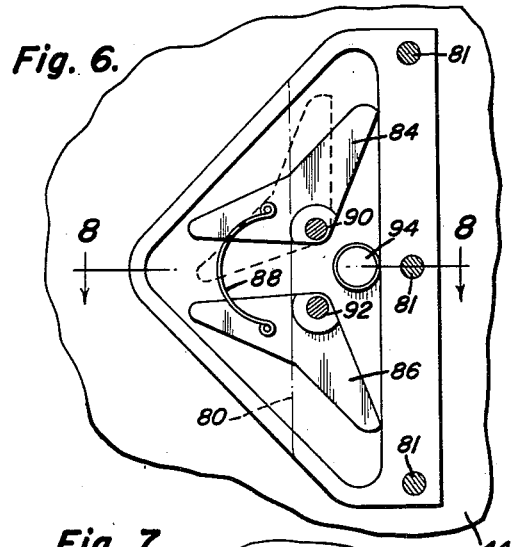
Figure 7:
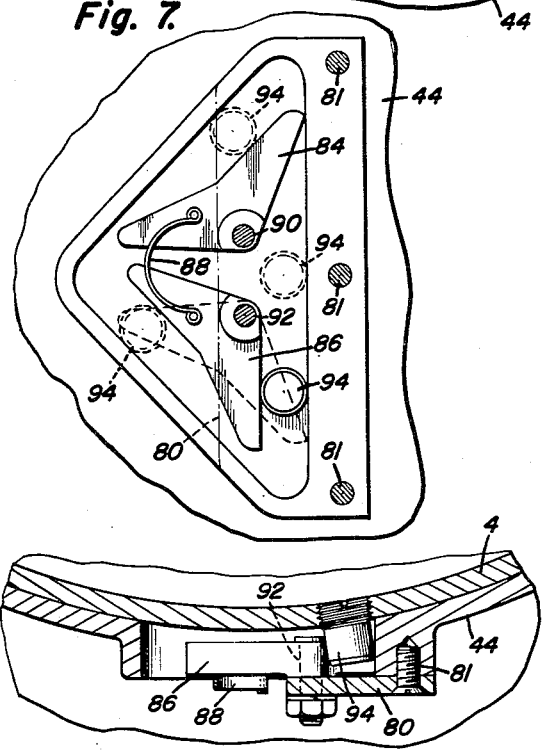
Figure 8:
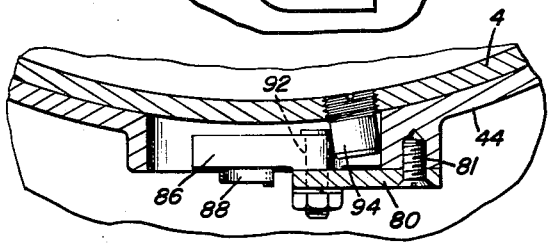

Fig. 4 shows a lateral section through 4, 4 of Fig. 3.
Fig. 5 shows a lateral section through 5, 5 of Fig. 2.
Figs. 6 and 7 show two positions of limiting mechanism of Fig. 1, shown at 80 to 86.
Fig. 8 shows a section at 8, 8 of the mechanism of Fig. 6.
Fig. 9 shows a simplified form of a limiting mechanism.

The shock absorber of the present invention is assembled by concentrically welding the inner and outer cylinders to the base casting 14. The inner cylinder 4 is attached to the top casting 18 by crimping as shown at 30, and the outer cylinder 2 is crimped over the top casting 18 and packing cap 20 as shown at 21. This top crimping also serves to hold packing 22 about piston rod 6. The packing is kept compressed by means of coil spring 26 acting against packing pressure plate 24. This packing serves to sweep piston rod 6 free of any hydraulic fluid that may pass through opening 19 in upper casting 18. This fluid will then drain back into the reservoir through drain holes 28. The piston rod is fitted with an outer dust shield 10 and top mounting eye 12. A bottom mounting eye 16 is attached to base casting 14. The outer cylinder 2 and the inner cylinder 4 are attached to the base casting 14 at 36 and 32 respectively.

The bottom of the inner cylinder is fitted with openings 34, and a valve opening 40 which is covered with a flap valve 38. This in turn is held down by valve springs 42. This valve serves to keep the inner cylinder constantly filled with oil from the concentric reservoir surrounding the inner cylinder.

Piston 8 is attached to piston rod 6 and is equipped with openings 9 which permit the oil to pass from one side of the piston to the other as the latter moves in the cylinder. The inner cylinder 4 is constantly full of fluid and the reservoir between the cylinders is substantially full of oil with only enough space remaining to serve for expansion purposes.

The inner cylinder has a close fitting sleeve valve 44 which extends substantially the length of the inner cylinder. This sleeve is fitted with inertia weight 58 which is of a size sufficient to make the sleeve valve sensitive to quick movements of the shock absorber body. The sleeve is fitted with an annular row of openings 46 and 52 at the bottom and top respectively. Similar openings, spaced in double rows, 54, 56, and 48, 50 appear in the inner cylinder at top and bottom respectively. The sleeve valve is centrally positioned by means of upper and lower stop collars 60 and 62 which engage upper and lower stop pins 64 and 66 respectively. These stop collars are fitted with drain holes 69 in the flanges thereof. Upper and lower springs 70 and 72 keep the collars in contact with the pins and thereby serve to hold the sleeve valve in a central position. When in this position, the row of holes in the sleeve are midway between the double rows of holes in the inner cylinder, with the result that the valve is effectively closed. When the sleeve is moved in either direction to the limits of its longitudinal motion, which is determined by pins 94 or 102, then the holes in the sleeve and inner cylinder will coincide (Fig. 3) with the result that the oil is free to flow in and out of both ends of the cylinder. When this situation obtains, there will be little resistance offered to the moving piston as the oil will flow freely out into the reservoir at one end and into the inner cylinder at the other end. The holes in the sleeve may be greatly elongated laterally to insure that they will uncover the holes in the inner cylinder. At the same time that the sleeve valve moves longitudinally, it is also free to rotate laterally on the inner cylinder. To center the sleeve with respect to this lateral movement, the stop collars 60 and 62 are fitted with guide pins 68 which fit into holes 59 of the inertia weights. In like manner, the springs 70 and 72 have hooked ends 61 which engage holes in the stop collars (Fig. 1).

The other end of the springs are attached to the outer cylinder at 74 and 76. Since the springs are wound in reverse or opposite directions they tend to center the stop collars and therefore the sleeve valve laterally and resist its rotation around the inner cylinder. The result is that if the sleeve valve is rotated in either direction, it will tend to regain its initial position by centering action of the springs.

Instead of the proportions shown, the inertia weight 58 may extend a larger proportion of the length of the sleeve valve and the two centering springs 70 and 72 may then be attached to the end castings 14 and 18 instead of the fastening means 74 and 76. In another alternative construction, the inertia weight may be divided and the respective halves located near each end of the sleeve valve. Other types of construction that will accomplish the same results are equally suitable.

The sleeve valve 44 is free to move up and down over the inner cylinder 4 thereby opening and closing the ports at each end of the cylinder. The movement of the sleeve valve is brought about by inertia weight 58. When a quick movement of the lower portion of the shock absorber takes place, the inertia weight causes the sleeve valve to lag behind in its motion with the result that the valve moves with respect to the inner cylinder. To limit the movement of the sleeve valve, there is provided a limiting mechanism shown in Figs. 6 to 9. Basically, the mechanism includes a pin 94 or 102 which is fixed to the inner cylinder 4, and an opening in the sleeve valve cylinder 44 through which the pin passes. The length of this opening is such that when the pin is at either extremity the valves at the ends will be open. The modification of the limiting mechanism shown in Figs. 6 and 7 includes two pivoted stop elements 84 and 86. These are supported by plate 80 which in turn is attached to sleeve valve 44 by screws 81. Elements 84 and 86 are biased apart by spring 88. These are arranged so that when the pin 94 moves toward either end of the opening, the stop element pivots out of the way as shown in lower part of Fig. 7. When the pin reaches the end of the opening, the pivoted stop element snaps behind the pin as shown at the top of Fig. 7, and in moving back to a centered position the pin must take a diagonal course. This necessitates the rotating of the valve 44 over the inner cylinder 4 against the biasing action of springs 70 and 72. When pin 94 reaches a middle position, it will be stopped by the opposite stop element, hence the sleeve valve is stopped in mid-position on its return. In the meantime, the sleeve valve will turn under the influence of the spring bias until pin 94 is back in its original position shown in Fig. 6 when it is ready to pass through another cycle.

A simplified form of limiting mechanism is shown in Fig. 9. Here pin 102 is fixed to the inner cylinder and the shaped opening 100 is cut in the sleeve valve 44. Spring biasing again centers the pin as shown. When there is relative movement between the two elements, due to inertia forces, pin 102 must travel along inclined surfaces 101 until it strikes the end of opening 100. This travel distance is such that the valves at both ends of the sleeve valve are then in the open position (Fig. 3). When the inertia forces are reversed, the pin reverses its travel down the straight portion of opening 100 until it strikes sides 103 which stops its movement in mid-position at which time the end valves are closed. The reason why pin 102 does not follow inclined wall 101 in retracing its path is the fact that the inertia forces are so fast acting that the bias springs 70 and 72 do not have a chance to turn sleeve valve 44 with respect to cylinder 4 before the pin has returned and hit edge 103. By taking advantage of this speed of action of the inertia forces, it is possible to construct a relatively simple limiting mechanism as shown in Fig. 9, without the use of any moving parts except the two cylinders. It is to be understood that these are merely two forms of a limiting mechanism which may have a large number of embodiments. The only requirement is that when there is a quick movement on the part of the lower portion of the shock absorber, the sleeve valve 44 shall move to uncover the ports at each end of cylinder 4, thus permitting the hydraulic fluid to move in and out freely without substantially resisting the motion. On the return movement, on the other hand, the valve 44 moves only half ways, so as to close the end ports and resist or snub the motion. After a brief moment, the mechanism is reset for another cycle. Thus, this shock absorber will effectively snub both ways when the action is relatively moderate as when driving over average road surfaces. When large bumps are encountered, however, the inertia forces are so large as to come into play and open the end ports to remove the snubbing action on the first movement. On the return movement, the ports close to effect snubbing action. This single action effect serves to lessen the shocks in accordance with the theory earlier described, moreover, this single action is effective in either direction irrespective of which movement occurs first.

I claim:

1. A double acting shock absorber comprising a cylinder and piston, fluid storage means in connection with said cylinder, hydraulic fluid in said cylinder and storage means, valve means in connection with said cylinder, which valve means serves to bleed fluid around said piston through a by-pass upon rapid longitudinal acceleration of said cylinder, said valve means comprising a weighted sleeve surrounding said cylinder and being longitudinally spring centered to hold said by-pass in a closed position, a limiting mechanism in connection with said sleeve valve which permits the sleeve valve to move in either direction to the end of its travel thereby to open the by-pass when the cylinder is rapidly accelerated in either direction, but which limiting mechanism prevents the sleeve valve from returning beyond its centered and closed position when the cylinder is immediately and rapidly accelerated in the opposite direction.

2. A double acting shock absorber in accordance with claim 1 wherein said limiting mechanism includes an elongated opening in the sleeve valve and a pin fixed to the cylinder and projecting through said opening.

3. A double shock absorber in accordance with claim 2 wherein said opening is fitted with pivoted latches which serve to angularly deflect the sleeve valve with respect to the pin.

4. A double acting shock absorber in accordance with claim 2 wherein said opening is shaped so as to cause the sleeve valve to be angularly displaced with respect to the cylinder during the initial movement of said sleeve valve with respect to said cylinder.

5. A double acting shock absorber in accordance with claim 4 wherein the return movement of the sleeve valve does not retrace the angular displacement of the initial movement of said sleeve valve.

6. A double acting shock absorber comprising a piston and cylinder, an outside cylinder concentric with said first cylinder forming an annular fluid storage reservoir therewith, hydraulic fluid in said cylinder and storage reservoir, a weighted movable sleeve valve surrounding said first cylinder, which valve is longitudinally centered by spring means, said first cylinder and said sleeve valve having peripheral perforations at each end which together constitute a by-pass for hydraulic fluid around the piston whenever the sleeve valve is at either extremity of its travel, and which by-pass is closed when said sleeve valve is in a longitudinally centered position, said sleeve valve including a limiting mechanism that permits the valve to move in either direction to the end of its travel when the cylinder is suddenly accelerated, but which limiting mechanism prevents the sleeve valve from returning beyond its centered position when the cylinder is suddenly accelerated in the opposite direction following the initial movement.

7. A double acting shock absorber comprising a cylinder and piston, fluid storage means in connection with said cylinder, hydraulic fluid in said cylinder and storage means, spring centered inertia actuated valve means associated with said cylinder, which valve means is closed when in its center position and is capable of moving in either direction to open a by-pass and bleed fluid around said piston upon rapid acceleration of said cylinder in either direction, limiting means associated with said valve means for stopping said valve means in a central and closed position upon the immediate and rapid reverse acceleration of said cylinder.

References Cited in the file of this patent

UNITED STATES PATENTS

| 1,447,088 | Kerr | Feb. 27, 1923 |
| 1,573,058 | Hanford | Feb. 16, 1926 |
| 2,144,583 | Focht | Jan. 17, 1939 |
| 2,410,992 | Myklestad | Nov. 12, 1946 |
| 2,559,968 | Katz | July 10, 1951 |
| 2,672,952 | Smith | Mar. 23, 1954 |

FOREIGN PATENTS

| 418,411 | France | Sept. 27, 1910 |
| 525,065 | France | May 26, 1921 |
| 546,236 | France | Aug. 17, 1922 |